United States Patent
NarasimhaMurthy et al.

(10) Patent No.: US 12,504,435 B2
(45) Date of Patent: *Dec. 23, 2025

(54) HYPOTHESIZING AND VERIFICATION NETWORKS AND METHODS FOR SPECIMEN CLASSIFICATION

(71) Applicant: Siemens Healthcare Diagnostics Inc., Tarrytown, NY (US)

(72) Inventors: Venkatesh NarasimhaMurthy, Hillsborough, NJ (US); Vivek Singh, Princeton, NJ (US); Yao-Jen Chang, Princeton, NJ (US); Benjamin S. Pollack, Jersey City, NJ (US); Ankur Kapoor, Plainsboro, NJ (US)

(73) Assignee: Siemens Healthcare Diagnostics Inc., Tarrytown, NY (US)

(*) Notice: Subject to any disclaimer, the term of this patent is extended or adjusted under 35 U.S.C. 154(b) by 1023 days.

This patent is subject to a terminal disclaimer.

(21) Appl. No.: 17/278,289

(22) PCT Filed: Sep. 19, 2019

(86) PCT No.: PCT/US2019/052014
§ 371 (c)(1),
(2) Date: Mar. 19, 2021

(87) PCT Pub. No.: WO2020/061370
PCT Pub. Date: Mar. 26, 2020

(65) Prior Publication Data
US 2021/0333298 A1    Oct. 28, 2021

Related U.S. Application Data

(60) Provisional application No. 62/734,007, filed on Sep. 20, 2018.

(51) Int. Cl.
*G01N 33/48* (2006.01)
*G01N 33/50* (2006.01)
(Continued)

(52) U.S. Cl.
CPC ... *G01N 35/00732* (2013.01); *G06F 18/2413* (2023.01); *G06N 3/04* (2013.01);
(Continued)

(58) Field of Classification Search
CPC .......... G01N 35/00732; G06F 18/2413; G06N 3/04; G06T 7/0012; G06T 2207/20084
See application file for complete search history.

(56) References Cited

U.S. PATENT DOCUMENTS 9,322,761 B2    4/2016    Miller
9,739,783 B1    8/2017    Kumar et al.
(Continued)

FOREIGN PATENT DOCUMENTS

CN    105354611 A    2/2016
CN    105825509 A    8/2016
(Continued)

OTHER PUBLICATIONS

Doan et al. Label-free assessment of red blood cell storage lesions by deep learning. bioRxiv, Feb. 1, 2018, 23 pages. (Year: 2018).*
(Continued)

*Primary Examiner* — Russell S Negin (57) ABSTRACT

A method of characterizing a specimen as containing hemolysis, icterus, or lipemia is provided. The method includes capturing one or more images of the specimen, wherein the one or more images include a serum or plasma portion of the specimen. Pixel data is generated by capturing the image. The pixel data of the one or more images of the specimen is processed using a first network executing on a computer to predict a classification of the serum or plasma
(Continued)

portion, wherein the classification comprises hemolysis, icterus, and lipemia. The predicted classification is verified using one or more verification networks. Quality check modules and specimen testing apparatus adapted to carry out the method are described, as are other aspects.

21 Claims, 7 Drawing Sheets

(51) Int. Cl.
*G01N 35/00* (2006.01)
*G06F 18/2413* (2023.01)
*G06N 3/04* (2023.01)
*G06T 7/00* (2017.01)
*G06V 10/764* (2022.01)
*G06V 10/82* (2022.01)
*G06V 20/69* (2022.01)

(52) U.S. Cl.
CPC .......... *G06T 7/0012* (2013.01); *G06V 10/764* (2022.01); *G06V 10/82* (2022.01); *G06V 20/698* (2022.01); *G06T 2207/20084* (2013.01)

(56) References Cited

U.S. PATENT DOCUMENTS

| | | | |
|---|---|---|---|
| 10,198,832 | B2 | 2/2019 | De Fauw et al. |
| 11,852,642 | B2 * | 12/2023 | NarasimhaMurthy ...................... G06V 10/82 |
| 2010/0220916 | A1 * | 9/2010 | Salafia ...................... G06T 7/62 382/134 |
| 2017/0364771 | A1 | 12/2017 | Pinheiro et al. |
| 2017/0372193 | A1 | 12/2017 | Mailhe et al. |
| 2018/0021820 | A1 | 1/2018 | Gabauer et al. |
| 2018/0045654 | A1 | 2/2018 | Park et al. |
| 2018/0364268 | A1 | 12/2018 | Kluckner et al. |
| 2018/0365530 | A1 | 12/2018 | Kluckner et al. |
| 2018/0372648 | A1 | 12/2018 | Wissmann et al. |
| 2018/0372715 | A1 | 12/2018 | Kluckner et al. |
| 2019/0033209 | A1 | 1/2019 | Kluckner et al. |
| 2019/0033230 | A1 | 1/2019 | Kluckner et al. |
| 2021/0064927 | A1 | 3/2021 | Kluckner et al. |
| 2021/0133971 | A1 | 5/2021 | Ma et al. |

FOREIGN PATENT DOCUMENTS

| | | |
|---|---|---|
| CN | 106250866 A | 12/2016 |
| CN | 106372390 A | 2/2017 |
| CN | 106408562 A | 2/2017 |
| CN | 107424159 A | 12/2017 |
| CN | 107430693 A | 12/2017 |
| CN | 107909566 A | 4/2018 |
| CN | 108364006 A | 8/2018 |
| CN | 108596166 A | 9/2018 |
| EP | 3018482 A1 | 5/2016 |
| JP | H8-315144 A | 11/1996 |
| JP | H9-120455 A | 5/1997 |
| JP | H9-133687 A | 5/1997 |
| JP | H10-302067 A | 11/1998 |
| JP | 2885823 B2 | 4/1999 |
| JP | 3445799 B2 | 9/2003 |
| JP | 2008-268265 A | 11/2008 |
| JP | 5597248 A | 10/2014 |
| JP | 2016-514869 A | 5/2016 |
| JP | 2017-510927 A | 4/2017 |
| JP | 2019500100 A | 1/2019 |
| JP | 2019-515898 A | 6/2019 |
| JP | 2019-518224 A | 6/2019 |
| WO | 2014153423 A2 | 9/2014 |
| WO | 2016/133900 A1 | 8/2016 |
| WO | 2017102827 A1 | 6/2017 |
| WO | 2017106645 A1 | 6/2017 |
| WO | 2017/132172 A1 | 8/2017 |
| WO | 2018009405 A1 | 1/2018 |
| WO | 2018/022280 | 2/2018 |
| WO | 2018/022280 A1 | 2/2018 |
| WO | 2018039380 A1 | 3/2018 |
| WO | 2018/089935 A1 | 5/2018 |
| WO | 2018/089938 A1 | 5/2018 |
| WO | 2018081617 A2 | 5/2018 |
| WO | 2018105062 A1 | 6/2018 |
| WO | 2018/188023 A1 | 10/2018 |
| WO | 2018/191287 A1 | 10/2018 |
| WO | 2018/191295 A1 | 10/2018 |
| WO | 2018/225448 | 12/2018 |
| WO | 2019/018314 A1 | 1/2019 |
| WO | 2019/023376 A1 | 1/2019 |
| WO | 2019/241128 A1 | 12/2019 |
| WO | 2019/241134 A1 | 12/2019 |

OTHER PUBLICATIONS

Keras: "Image Recongition by Deep learning"; vol. 3; Apr. 7, 2017; pp. 1-8; https://Ip-tech.net/articles/Y56uo.

Huang, G. et al: "Densely Connected Convolutional Networks"; 2017 IEEE Conference on Computer Vision and Pattern Recognition (CVPR); pp. 2261-2269; URL: https://ieeexplore.ieee.org/document/8099726; Trend of Recent Studies on Convolutional Neural Networks (~2017);https://qiita.com/yu4u/items/7e93c454c9410c4b5427.

PCT International Search Report and Written Opinion dated Dec. 12, 2019 (10 Pages).

Huang, G. et al. "Densely Connected Convolutional Networks". Jul. 21-26, 2017; <URL:http:/openaccess.thecvf.com/content_cvpr_2017/papers/Huang_Densely_Connected_Convolutional_CVPR_2017_paper.pdf> figure1; p. 1, paragraph 1.

Demirci, F. et al. "Artificial Neural Network Approach in Laboratory Test Reporting" Am J Clin Pathol Aug. 2016; 146:227-237, Jul. 27, 2016. <DOI: 10.1093/AJCP/AQW104>, entire document.

Goodfellow, Ian, et al. "Generative adversarial nets." Advances in neural information processing systems 27 (2014) pp. 1-9.

Hideki, Aso et al. "Deep Representation Learning by Multi-Layer Neural Networks"; The Japanese Society for Artificial Intelligence; Year: Jul. 2013, vol. 28 No. 4, pp. 649-659.

Jégou, Simon, et al. "The one hundred layers tiramisu: Fully convolutional densenets for semantic segmentation." Proceedings of the IEEE conference on computer vision and pattern recognition workshops. 2017.

Lecun, Yann et al. "Gradient-based learning applied to document recognition" Proceedings of the IEEE, New York, US, vol. 86, No. 11, Nov. 1, 1998, pp. 2278-2323, 1998 // ISSN: 0018-9219, DOI: 10.1109/5.726791.

Ren, Shaoqing et al: "Faster R-CNN: Towards Real-Time Object Detection with Region Proposal Networks"; IEEE Transactions On Pattern Analysis and Machine Intelligence; vol. 39, No. 6, Sep. 13, 2015; pp. 1137-1149; XP055473561; USA; ISSN:0162-8828; DOI: 10.1109/TPAMI.2016.2577031.

Shah Urmil et al: "A Review of Deep Learning Models for Computer Vision", 2018 IEEE Punecon, IEEE, Nov. 30, 2018 (Nov. 30, 2018), pp. 1-6, XP033568970, DOI: 10.1109/PUNECON.2018.8745417.

* cited by examiner

HYPOTHESIZING AND VERIFICATION NETWORKS AND METHODS FOR SPECIMEN CLASSIFICATION

RELATED APPLICATIONS

This disclosure is a 371 of PCT/US2019/052014, filed Sep. 19, 2019, which claims priority to U.S. Provisional Patent Application No. 62/734,007, filed Sep. 20, 2018 and titled "HYPOTHESIZE AND HIERARCHICAL VERIFICATION NETWORK FOR CLASSIFICATION/REGRESSION TASK," the disclosures of which are hereby incorporated by reference in their entireties herein for all purposes.

FIELD

Embodiments of this disclosure relate to methods and apparatus for characterizing a specimen in an automated diagnostic analysis system.

BACKGROUND

Automated diagnostic analysis systems may conduct assays or clinical analyses using one or more reagents to identify an analyte or other constituent in a serum or plasma portion of a blood sample. Improvements in automated testing technology have been accompanied by corresponding advances in pre-analytical specimen preparation and handling operations such as sorting, batch preparation, centrifuging of specimen containers to separate specimen components, cap removal to facilitate fluid access, pre-screening for HILN (Hemolysis, Icterus, and/or Lipemia, or Normal), and the like by automated specimen preparation systems referred to as Laboratory Automation Systems (LASs). LASs may also automatically transport a specimen in a specimen container to a number of specimen processing stations so various operations (e.g., pre-analytical or analytical testing) can be performed thereon.

Where the specimen is whole blood, a gel separator may be added to the specimen container to aid in the separation of a settled blood portion from the serum or plasma portion. After pre-processing, the specimen container may be transported to an appropriate analyzer that may extract a portion of the biological fluid (e.g., serum or plasma portion) from the specimen container and combine the fluid with one or more reagents and possibly other materials in a reaction vessel (e.g., a cuvette). Analytical measurements may then be performed via photometric or fluorometric absorption readings by using a beam of interrogating radiation or the like. The measurements allow determination of end-point rate or other values, from which an amount of an analyte or other constituent in the biological fluid is determined.

However, the presence of any interferent (e.g., hemolysis, icterus, and/or lipemia) in the specimen, which may result from a patient condition or sample processing, may adversely affect test results of the analyte or constituent measurement obtained from the one or more analyzers. For example, the presence of hemolysis (H) in the specimen, which may be unrelated to a patient's disease state, may cause a different interpretation of the disease condition of the patient. Moreover, the presence of icterus (I) and/or lipemia (L) in the specimen may also cause a different interpretation of the disease condition of the patient.

In some systems, a skilled laboratory technician may visually inspect and rate the integrity of the serum or plasma portion of the specimen as either normal (N) or as having a degree of H, I, and/or L (e.g., by assigning an index). This process may involve a review of the color of the serum or plasma portion against known standards. However, such manual visual inspection is very subjective, labor intensive, and can involve possible human error.

Because manual inspection may be problematic, efforts have been made to evaluate specimen integrity without the use of manual visual inspection by a laboratory technician, but rather by using an automated machine-vision inspection apparatus, wherein such evaluation takes place during pre-analytical testing (hereinafter "pre-screening"). The pre-screening involves automated detection of an interferent, such as H, I, and/or L, in a serum or plasma portion obtained from whole blood by fractionation (e.g., by centrifugation).

In some instances, one or more labels may be affixed directly on the specimen container. Such labels may partially occlude and obscure certain lateral viewpoints of the specimen, so that there may be some orientations that do not provide a clear opportunity to visually observe the serum or plasma portion. Thus, automation of such pre-screening has included, for example, rotationally orienting the specimen in such a way that allows for automated pre-screening for H, I, and/or L or N (see e.g., U.S. Pat. No. 9,322,761). In other systems, the specimen container and specimen are imaged from multiple viewpoints and processed with model-based systems so that rotation of the specimen container is not needed (see, e.g., WO 2016/133,900).

In some instances, only a small portion of the serum or plasma portion may be visible, so that any H, I, and/or L, or N reading taken on the serum or plasma portion may not involve a high level of confidence. Moreover, such systems may be complicated and processing of the image data may be computationally burdensome.

Accordingly, there is an unmet need for a robust and efficient method and apparatus for characterizing a serum or plasma portion of a specimen in order to determine a presence and degree of hemolysis (H), icterus (I), and/or lipemia (L), or whether the serum or plasma portion of the specimen is normal (N). More particularly, there is an unmet need for improved methods and apparatus for determining if a specimen includes H, I, and/or L, and to what extent, or is normal (N).

SUMMARY

According to a first aspect, a method of characterizing a specimen is provided. The method includes capturing one or more images of the specimen with one or more image capture devices, the one or more images including a serum or plasma portion of the specimen, the capturing generating pixel data; processing pixel data of the one or more images of the specimen using a first network executing on a computer to predict a classification of the serum or plasma portion, wherein the classification comprises hemolysis, icterus, and lipemia; and verifying the predicted classification using one or more verification networks executing on the computer.

According to another aspect, a quality check module is provided. The quality check module includes a plurality of image capture devices operative to capture one or more images from one or more viewpoints of a specimen container containing a serum or plasma portion of a specimen therein; and a computer coupled to the plurality of image capture devices, the computer configured and operative to: capture one or more images of the specimen, the one or more images including a serum or plasma portion of the specimen, the capture generating pixel data; process pixel data of the one or more images of the specimen using a first network executing on the computer to predict a classification of the serum or plasma portion, wherein the classification comprises hemolysis, icterus, and lipemia; and verifying the predicted classification using one or more verification networks executing on the computer.

In another aspect, a specimen testing apparatus is provided. The specimen testing apparatus includes a track; a carrier moveable on the track and configured to contain a specimen container containing a serum or plasma portion of a specimen therein; a plurality of image capture devices arranged around the track and operative to capture one or more images from one or more viewpoints of the specimen container and the serum or plasma portion of the specimen; and a computer coupled to the plurality of image capture devices, the computer configured and operative to: capture one or more images of the specimen, the one or more images including a serum or plasma portion of the specimen, the capture generating pixel data; process pixel data of the one or more images of the specimen using a first network executing on the computer to predict a classification of the serum or plasma portion, wherein the classification comprises hemolysis, icterus, and lipemia; and verify the predicted classification using one or more verification networks executing on the computer.

Still other aspects, features, and advantages of this disclosure may be readily apparent from the following detailed description illustrated by a number of example embodiments and implementations, including the best mode contemplated. This disclosure may also be capable of other and different embodiments, and its several details may be modified in various respects. Accordingly, the drawings and descriptions are to be regarded as illustrative in nature, and not as restrictive. The drawings are not necessarily drawn to scale. This disclosure covers all modifications, equivalents, and alternatives falling within the scope of the subjoined claims.

BRIEF DESCRIPTION OF THE DRAWINGS

The drawings, described below, are for illustrative purposes and are not necessarily drawn to scale. Accordingly, the drawings and descriptions are to be regarded as illustrative in nature, and not as restrictive. The drawings are not intended to limit the scope of the invention in any way.

DETAILED DESCRIPTION

As stated, the presence of any interferent (e.g., hemolysis, icterus, and/or lipemia) in the specimen, which may result from a patient condition or sample processing, may adversely affect test results of the analyte or constituent measurement obtained from the one or more analyzers. For example, the presence of hemolysis (H) in the specimen, which may be unrelated to a patient's disease state, may cause a different interpretation of the disease condition of the patient. Moreover, the presence of icterus (I) and/or lipemia (L) in the specimen may also cause a different interpretation of the disease condition of the patient.

An interferent, such as H, I, and/or L, or a determination of normal (N) (hereinafter "HILN"), as used herein refers to the presence of at least one of hemolysis (H), icterus (I), or lipemia (L) in the serum or plasma portion of the specimen. "N" refers to "normal," which may be defined as a serum or plasma portion that includes acceptably low amounts of H, I, and L. Hemolysis may be defined as a condition in the serum or plasma portion wherein red blood cells are destroyed during processing, which leads to the release of hemoglobin from the red blood cells into the serum or plasma portion such that the serum or plasma portion takes on a reddish hue. The degree of hemolysis may be quantified by assigning a hemolytic index. Icterus may be defined as a condition of the blood where the serum or plasma portion is discolored dark yellow, caused by an accumulation of bile pigment (bilirubin). The degree of icterus may be quantified by assigning an Icteric Index. Lipemia may be defined as a presence in the blood of an abnormally high concentration of emulsified fat, such that the serum or plasma portion has a whitish or milky appearance. The degree of lipemia may be quantified by assigning a lipemic index.

The networks, systems, and methods disclosed herein include networks (e.g., neural networks) that verify HIL predictions. For example, a first network (e.g., a hypothesizing network) hypothesizes or predicts an HILN classification of specimens and later stage networks (e.g., verification networks) verify the predictions. Image data or pixel data representative of a specimen may be input to the first network where a hypothesis or prediction of an HILN classification is made. Based on the hypothesis of the HILN classification, the pixel data is further analyzed by one or more specialized verification networks. In some embodiments, the last layer or a layer close to the last layer generated by the first network may be further analyzed by the one or more specialized networks. In some embodiments, there may be a specialized verification network for each of the HIL or HILN classifications. For example, if the first network hypothesizes a hemolysis classification in the specimen, the pixel data may be further analyzed by a verification network trained to verify and/or detect hemolysis. Other verification networks may verify icterus, and/or lipemia hypotheses. In some embodiments, the system(s) may include similar verification networks to verify normal classifications. In some embodiments, the first network may predict or hypothesize an un-centrifuged (U) class for a serum or plasma portion of a specimen that has not been centrifuged.

In addition to the foregoing, methods, systems, and apparatus in accordance with embodiments disclosed herein may include a first network that predicts or hypothesizes a classification index of hemolysis (e.g., H0-H6 in some embodiments and more or less in other embodiments), a classification index of icterus (e.g., I0-I6 in some embodiments and more or less in other embodiments), and/or a classification index of lipemia (e.g., L0-L4 in some embodiments and more or less in other embodiments). In some embodiments, classification may be performed by regression to output HIL concentrations. The classification indexes may be referred to as degrees or sub-classes of a specific HIL classification. The results of the first network may be input into one or more index verification networks specific to the classification index of the interferent that was predicted by the first network. In some embodiments, the verification networks may provide a weighted response (e.g., a percentage) that identifies if the prediction of the first network is correct. In other embodiments, the verification networks may provide a binary output that identifies if the prediction of the first network is either correct or incorrect.

In some embodiments, the first network may classify (or "segment") various regions of the specimen container and specimen, such as a serum or plasma portion, settled blood portion, gel separator (if used), air, label, type of specimen container (indicating, e.g., height and width/diameter), and/or type and/or color of a specimen container cap. A specimen container holder and/or background may also be classified.

Given the challenges described above, in a first broad aspect, embodiments of this disclosure provide methods and apparatus configured to determine the presence and/or degree of HILN. A first network (e.g., a hypothesizing network) may use a segmentation convolutional neural network (SCNN) that includes a deep semantic segmentation network (DSSN) that outputs a predicted classification and/or a classification index of the specimen. In some embodiments, the DSSN may predict a classification index of the serum or plasma portion of the specimen identified in the specimen container based at least partially on color represented by the pixel data of the serum or plasma portion. The DSSN may include, in some embodiments, greater than 100 operational layers, described further below. The SCNN may also include a front-end container segmentation network (CSN) to determine a container type and a container boundary. This determined container information may then be input via an additional input channel to the DSSN, as described further below. Based on the classification predictions, further analysis may be performed by specialized verification networks to validate the predictions. In some embodiments, the apparatus and methods may include at least one index verification network for each HIL classification index.

In some embodiments, the input to the SCNN may be multi-spectral, multi-exposure pixel data or image data, which may be consolidated and normalized, and obtained from one or more image capture devices. An image capture device may be any device capable of capturing a pixelated image (e.g., digital image) for analysis, such as a digital camera, a CCD (charge-coupled device), one or more CMOS (complementary metal-oxide semiconductor) sensors, an array of sensors, or the like. Two or more image capture devices may be arranged and configured to capture images from multiple viewpoints (e.g., three viewpoints; other numbers of viewpoints are possible). In some embodiments, the methods, apparatus, and systems described herein may use high dynamic range (HDR) image processing of the specimen container and serum or plasma portion as an input to the SCNN. HDR imaging may involve capturing multiple exposures while using multiple spectral illuminations. In some embodiments, the SCNN is trained to recognize regions occluded by one or more labels on the specimen container so that the SCNN can better account for the presence of labels on the back side of the specimen container from any viewpoint in characterizing H, I, L or N.

In accordance with some aspects, the characterization methods may be carried out by a quality check module, and in specimen testing systems, each including the SCNN. The SCNN may include operational layers including, e.g., BatchNorm, ReLU activation, convolution (e.g., 2D), dropout, and deconvolution (e.g., 2D) layers to extract features, such as simple edges, texture, and parts of the serum or plasma portion and label-containing regions. Top layers, such as fully convolutional layers, may be used to provide correlation between parts. The output of the layers may be fed to a SoftMax layer, which produces an output on a per pixel (or per patch—including n×n pixels) basis concerning whether each pixel or patch includes H, I, L or N. In some embodiments, only an output of H, I, L or N may be provided from the SCNN. In other embodiments, the output of the SCNN may be a fine-grained H, I, L or N with greater than 20 serum classes or indexes of H, I, L or N so that for each interferent present, an estimate of the level (index) of the interferent is also obtained.

Should the specimen be found to contain one or more of H, I, and L, a suitable notice may be provided to the operator, and/or the specimen container may be taken off line (1) to perform a remediation to rectify the one or more of the H, I, or L, (2) to redraw the specimen, or (3) to perform other processing. Thus, the ability to pre-screen for H, I, L or N, such as at the first possible instance after centrifugation, and before analysis by one or more analyzers, may advantageously (a) minimize time wasted analyzing specimens that are not of the proper quality for analysis, (b) avoid or minimize erroneous test results, (c) minimize patient test result delay, and/or (d) avoid wasting of patient specimen.

Further details of characterization and verification methods, apparatus, systems, and quality check modules configured to carry out the characterization and verification methods, and specimen testing apparatus including one or more quality check modules will be further described with reference to FIGS. 1A-6 herein.

Figures 1A, 1B:
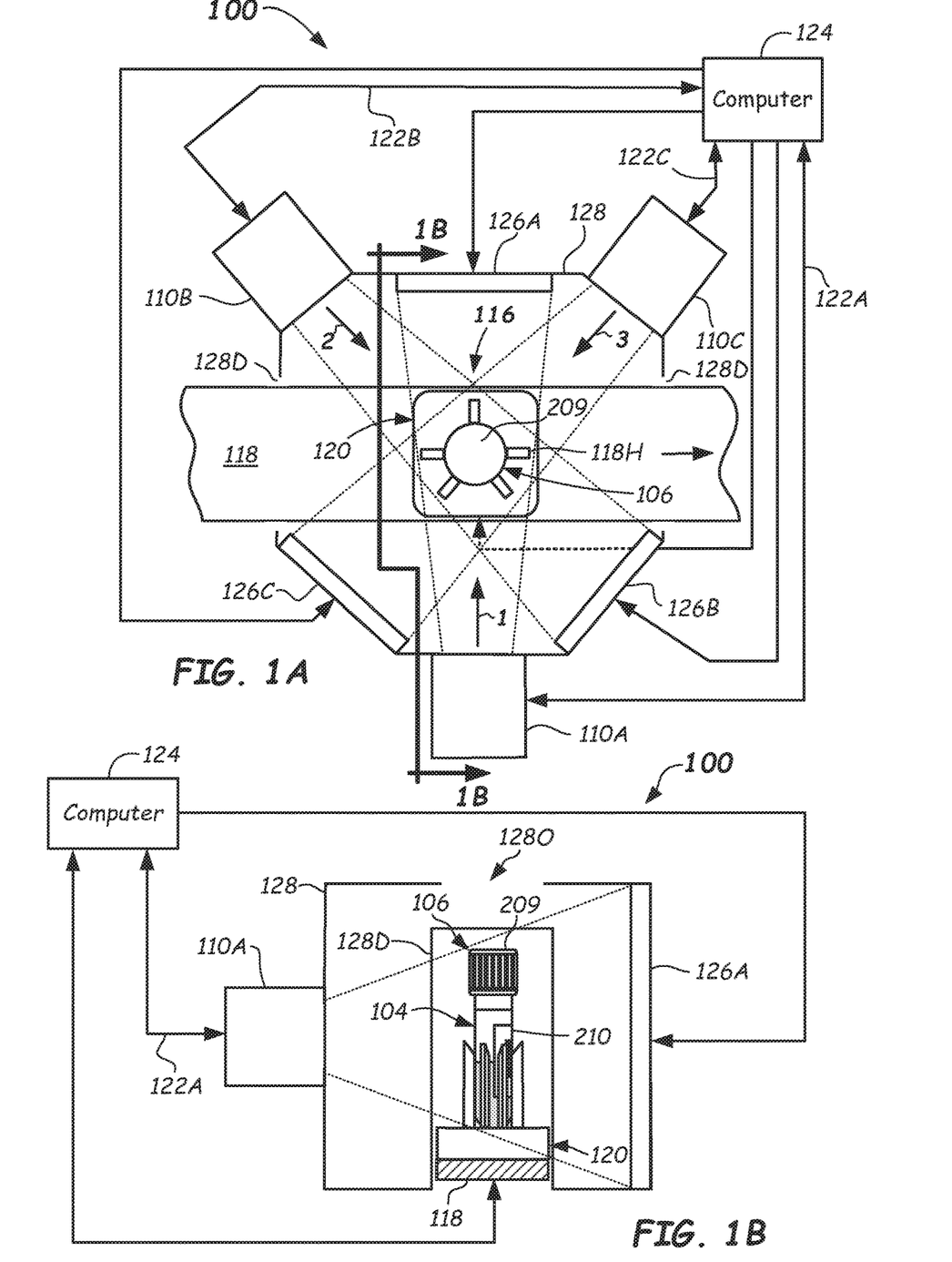
FIG. 1A illustrates a schematic top view of a quality check module (with top removed) including multiple viewpoints of a specimen container and configured to capture and analyze multiple backlit images of the specimen container to enable a determination of a presence and degree of an interferent according to one or more embodiments.
FIG. 1B illustrates a schematic side view of the quality check module (with front enclosure wall removed) of FIG. 1A taken along section line 1B-1B of FIG. 1A according to one or more embodiments.

Reference is now made to FIGS. 1A and 1B, which illustrate an embodiment of a quality check module 100 configured to carry out the characterization and verification methods as shown and described herein. Quality check module 100 may be configured to pre-screen for the presence and degree (e.g., index) of an interferent (e.g., H, I, and/or L) in a specimen 104 located in a specimen container 106 prior to analysis by the one or more analyzers (FIG. 3C) coupled to the quality check module. Pre-screening in this manner allows for additional processing, additional quantification, and/or characterization, and/or discarding and/or redrawing of a specimen 104 without wasting valuable analyzer resources or possibly having the presence of an interferent affect the veracity of the test results. The quality check module 100 may also determine if the specimen 104 is normal.

In addition to the interferent detection methods described herein, other detection methods may be performed on the specimen 104 contained in the specimen container 106 at the quality check module 100. For example, a method may be carried out at the quality check module 100 to provide segmentation as an output from a container segmentation network (CSN 462—FIG. 4). The segmentation data may be used in a post processing step to quantify the specimen 104, i.e., determine certain physical dimensional characteristics of the specimen 104.

Figure 2:
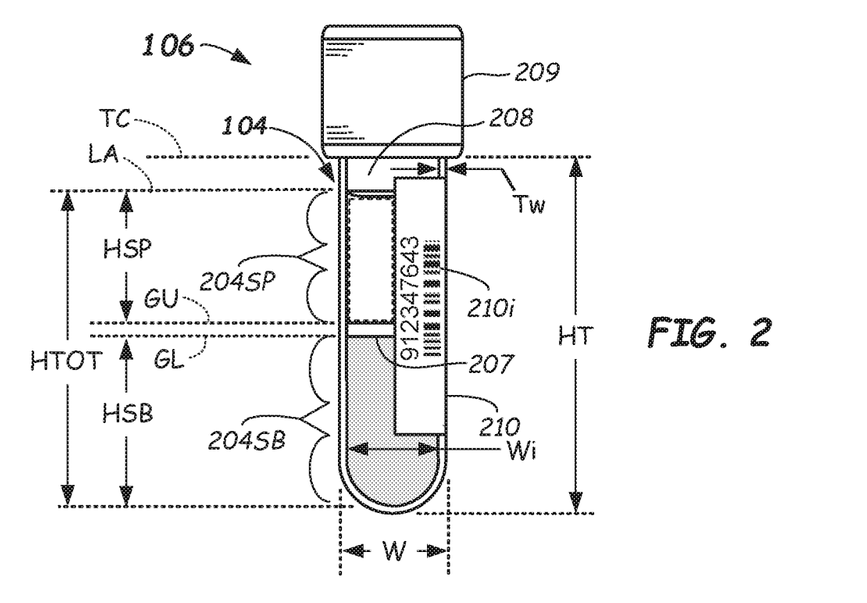
FIG. 2 illustrates a side view of a specimen container including a separated specimen with a serum or plasma portion and a settled blood portion wherein the specimen container includes a label thereon according to one or more embodiments.

Additional reference is made to FIG. 2, which illustrates a side view of the specimen container 106 including the specimen 104 according to one or more embodiments. The specimen 104 may include a gel separator 207 that separates a serum or plasma portion 204SP of the specimen 104 from a settled blood portion 204SB of the specimen 104. Air 208 may be provided above the serum or plasma portion 204SP and a line of demarcation between them is defined as the liquid-air interface (LA). A cap 209 may seal the specimen container 106. The physical characteristics at least partially determined by segmentation may include the location of the top (TC) of the specimen container 106, the height (HT) of the specimen container 106, the width (W) of the specimen container 106, the interior width (Wi) of the specimen container 106, and the thickness (Tw) of the wall of the specimen container 106. In addition, the segmentation data may provide the location the liquid-air interface (LA), the total height (HTOT) of the specimen 104, and an upper location (GU) and a lower location (GL) of the gel separator 207. The difference between the upper location (GU) and the lower location (GL) provides the height of the gel separator 207. The characteristics may further include the height HSP of a serum or plasma portion 204SP and a height HSB of the settled blood portion 204SB. Quantification may also involve estimating a volume of the serum or plasma portion and/or a volume of the settled blood portion. Other quantifiable geometrical features may also be determined, such as the size and color of the cap 209.

The specimen container 106 may be provided with a label 210, which may include identification information 210i (i.e., indicia) thereon, such as a barcode, alphabetic, numeric, or combinations thereof. The identification information 210i may be machine readable at various locations including at the quality check module 100. The machine readable information may be darker (e.g., black) than the label material (e.g., white paper) so that it can be readily imaged. The identification information 210i may indicate, or may otherwise be correlated to, via a Laboratory Information System (LIS), a patient's identification as well as tests to be performed on the specimen 104. The identification information 210i may indicate other or additional information. The above-described identification information 210i may be provided on the label 210, which may be adhered to or otherwise provided on an outside surface of the specimen container 106. As shown in FIG. 2, the label 210 may not extend all the way around the specimen container 106 or all along a length of the specimen container 106 such that from the particular front viewpoint shown, a large part of the serum or plasma portion 204SP is viewable (the part shown dashed) and unobstructed by the label 210.

In some embodiments, multiple labels may have been provided (such as from multiple facilities that have handled the specimen container 106), and the multiple labels may overlap each other to some extent. For example, two labels (e.g., a manufacturer's label and a barcode label) may be provided and may be overlapping and may occlude (obstruct) some or all of one or more viewpoints. Thus, it should be understood that in some embodiments, although the label(s) 210 may occlude some portion of the specimen 104 (an occluded portion), some portion of the specimen 104 and serum or plasma portion 204SP may still be viewable from at least one viewpoint (an un-occluded portion). Thus, in accordance with another aspect of the disclosure, embodiments of the SCNN configured to carry out the characterization method can be trained to recognize the occluded and un-occluded portions, such that improved HILN detection may be provided.

Referring again to FIGS. 1A and 1B, the quality check module 100 may include one or more image capture devices 110A, 110B, 110C that image the specimen container 106 through viewpoints 1, 2 and 3, respectively. Three image capture devices 110A-110C are shown in FIG. 1A, but optionally two or four or more can be used. Image capture devices 110A-110C may be any suitable device for capturing well-defined digital images, such as conventional digital cameras capable of capturing pixelated images, charged coupled devices (CCD), an array of photodetectors, one or more CMOS sensors, or the like. The three image capture devices 110A-110C illustrated in FIG. 1A are configured to capture images from three different lateral viewpoints (viewpoints labeled 1, 2, and 3). In some embodiments, the captured image size may be, e.g., about 2560×694 pixels. In another embodiment, the image capture devices 110A-110C may capture an image size that may be about 1280×387 pixels, for example. Other image sizes and pixel densities may be used.

Each of the image capture devices 110A-110C may be configured and operable to capture lateral images of at least a portion of the specimen container 106, and at least a portion of the specimen 104. For example, the image capture devices 110A-110C may capture a part of the label 210 and part or all of the serum or plasma portion 204SP (FIGS. 2A and 2B). In some instances, part of a viewpoint 1-3 may be partially occluded by the label 210. In some embodiments, one or more of the viewpoints 1-3 may be fully occluded, i.e., no clear view of the serum or plasma portion 204SP may be possible. However, even in cases where a side (front side or back side) of a viewpoint 1-3 is fully occluded by one or more labels 210, the characterization methods may still be able to distinguish the boundaries of the serum or plasma portion 204SP through the one or more labels 210.

In the embodiment shown, the plurality of image capture devices 110A-110C are configured to capture lateral images of the specimen container 106 and specimen 104 at an imaging location 116 from the multiple viewpoints 1-3. The viewpoints 1-3 may be arranged so that they are approximately equally spaced from one another, such as about 120° from one another, as shown. As depicted, the image capture devices 110A-110C may be arranged around a track 118 on which the specimen container 106 is transported. Other arrangements of the plurality of image capture devices 110A-110C may be used. In this way, the images of the specimen 104 in the specimen container 106 may be taken while the specimen container 106 is residing in a carrier 120 at the imaging location 116. The field of view of the multiple images obtained by the image capture devices 110A-110C may overlap slightly in a circumferential extent.

In one or more embodiments, the carrier 120 may be stopped at a predetermined location in the quality check module 100, such as at the imaging location 116. At this location, normal vectors from each of the image capture devices 110A-110C intersect each other. A gate or a linear motor (not shown) of the carrier 120 may be provided to stop the carrier 120 at the imaging location 116, so that multiple images may be captured thereat. In an embodiment where there is a gate at the quality check module 100, one or more sensors (not shown) may be used to determine the presence of the carrier 120 at the quality check module 100.

In some embodiments, the quality check module 100 may include a housing 128 that may at least partially surround or cover the track 118 to minimize outside lighting influences. The specimen container 106 may be located inside the housing 128 during the image-capturing sequences. Housing 128 may include one or more openings (and/or doors) 128D to allow the carriers 120 to enter into and/or exit from the housing 128. In some embodiments, the ceiling may include an opening 128O to allow a specimen container 106 to be loaded into the carrier 120 by a robot (not shown) including moveable robot fingers from above.

The image capture devices 110A-110C may be provided in close proximity to and trained or focused to capture an image window at the imaging location 116, wherein the image window is an area including an expected location of the specimen container 106. Thus, the specimen container 106 may be stopped so that it is approximately located in a center of the image window in some embodiments.

In operation of the quality check module 100, each image may be triggered and captured responsive to a triggering signal provided in communication lines 122A, 122B, 122C that may be sent by a computer 124. Each of the captured images may be processed by the computer 124 according to one or more embodiments described herein. In some methods, high dynamic range (HDR) processing may be used to capture and process the image data from the captured images. In more detail, multiple images are captured of the specimen 104 at the quality check module 100 at multiple different exposures (e.g., at different exposure times), while being sequentially illuminated with one or more different spectra. For example, each image capture device 110A-110C may capture 4-8 images of the specimen container 106 including the serum or plasma portion 204SP (FIG. 2) at different exposure times with each of multiple spectra. For example, 4-8 images may be captured by image capture device 110A at viewpoint 1 while the specimen 104 is backlit illuminated with light source 126A that has a red spectrum. Additional like images may be captured sequentially at viewpoints 2 and 3. Other numbers of images may be captured.

In some embodiments, capturing the multiple spectral images may be accomplished using different light sources 126A, 126B, and 126C emitting different spectral illumination. The light sources 126A-126C may back light the specimen container 106 (as shown). A light diffuser may be used in conjunction with the light sources 126A-126C in some embodiments. The multiple different spectra light sources 126A-126C may be red, green, blue (RGB) light sources, such as light-emitting diodes (LEDs) emitting nominal wavelengths of 634 nm+/−35 nm (Red), 537 nm+/−35 nm (Green), and 455 nm+/−35 nm (Blue). In other embodiments, the light sources 126A-126C may be white light sources. In cases where the label 210 obscures multiple viewpoints, infrared (IR) backlighting or near infrared (NIR) backlighting may be used. Furthermore, RGB light sources may be used in some instances even when label occlusion is present. In other embodiments, the light sources 126A-126C may emit one or more spectra having a nominal wavelength between about 700 nm and about 1200 nm. Other light sources and/or wavelengths may be used.

By way of a non-limiting example, to capture images at a first wavelength, three red light sources 126A-126C (wavelength of about 634 nm+/−35 nm) may be used to sequentially illuminate the specimen 104 from three lateral locations. The red illumination by the light sources 126A-126C may occur as the multiple images (e.g., 4-8 images or more) at different exposure times are captured by each image capture device 110A-110C from each viewpoint 1-3. In some embodiments, the exposure times may be between about 0.1 ms and 256 ms. Other exposure times may be used. In some embodiments, each of the respective images for each of the image capture devices 110A-110C may be taken sequentially, for example. Thus, for each viewpoint 1-3, a group of images may be sequentially obtained that have red spectral backlit illumination and multiple exposures (e.g., 4-8 exposures, such as different exposure times). The images may be captured in a round robin fashion, for example, where all images from viewpoint 1 are captured followed sequentially by viewpoints 2 and 3.

Once the red illuminated images are captured in the embodiment of FIGS. 1A-1B, another spectra of light, for example, from green spectral light sources 126A-126C may be turned on (nominal wavelength of about 537 nm with a bandwidth of about +/−35 nm), and multiple images (e.g., 4-8 or more images) at different exposure times may be sequentially captured by each of the image capture devices 110A-110C. This may be repeated with blue spectral light sources 126A-126C (nominal wavelength of about 455 nm with a bandwidth of about +/−35 nm) for each of the image capture devices 110A-110C. The different nominal wavelength spectral light sources 126A-126C may be accomplished by light panels including banks of different desired spectral light sources (e.g., R, G, B, W, IR, and/or NIR) that can be selectively turned on and off, for example. Other means for backlighting may be used.

In some embodiments, the multiple images taken at multiple exposures (e.g., exposure times) for each respective wavelength spectra may be obtained in rapid succession, such that the entire collection of backlit images for the specimen container 106 and specimen 104 from multiple viewpoints 1-3 may be obtained in less than a few seconds, for example. In some embodiments, four different exposure images for each wavelength at three viewpoints 1-3 using the image capture devices 110A-110C and back lighting with RGB light sources 126A-126C will result in 4 images×3 spectra×3 image capture devices=36 images. In another embodiments, four different exposure images for each wavelength at three viewpoints using the image capture devices 110A-110C and back lighting with R, G, B, W, IR, and NIR light sources 126A-126C will result in 4 images×6 spectra×3 cameras=72 images. Other numbers of images may be used.

According to embodiments of the characterization and verification methods provided herein, the processing of the image data or pixel data may involve a pre-processing step including, for example, selection of optimally-exposed pixels from the multiple captured images at the different exposure times at each wavelength spectrum and for each image capture device 110A-110C, so as to generate optimally-exposed pixel data for each spectrum and for each viewpoint 1-3.

For each corresponding pixel (or patch of pixels), from each of the images captured by each of the image capture devices 110A-110C, pixels (or patches) exhibiting optimal image intensity may be selected from each of the different exposure images for each viewpoint 1-3. In some embodiments, optimal image intensity may be pixels (or patches) that fall within a predetermined range of intensities, such as between 180 and 254 on a scale of 0-255, for example. In another embodiment, optimal image intensity may be between 16 and 254 on a scale of 0-255, for example. If more than one pixel (or patch) in the corresponding pixel (or patch) locations of two exposure images is determined to be optimally exposed, the higher of the two may be selected, for example.

The selected pixels (or patches) exhibiting optimal image intensity may be normalized by their respective exposure times. The result is a plurality of normalized and consolidated spectral image data sets for the illumination spectra (e.g., R, G, B, white light, IR, and/or NIR—depending on the combination used) and for each image capture device 110A-110C where all of the pixels (or patches) are optimally exposed (e.g., one image data set per spectrum) and normalized. In other words, for each viewpoint 1-3, the data pre-processing carried out by the computer 124 may result in a plurality of optimally-exposed and normalized image data sets, one for each illumination spectra employed.

Figure 1C:
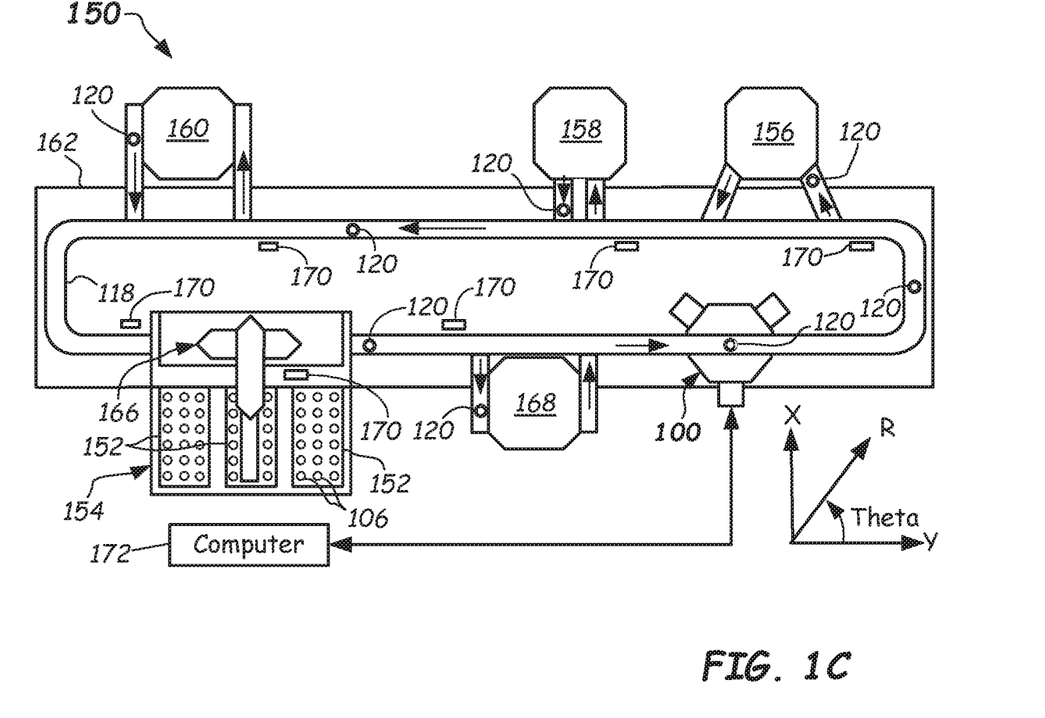
FIG. 1C illustrates a top schematic view of a specimen testing apparatus including one or more quality check modules configured to carry out HILN determination methods according to one or more embodiments.

FIG. 1C illustrates an example specimen testing apparatus 150 capable of automatically processing multiple specimen containers 106 containing specimens 104. The specimen containers 106 may be provided in one or more racks 152 at a loading area 154 prior to transportation to, and analysis by, one or more analyzers (e.g., first analyzer 156, second analyzer 158, and/or third analyzer 160) arranged about the specimen testing apparatus 150. More or less numbers of analyzers may be used. The analyzers may be any combination of clinical chemistry analyzers and/or assaying instruments, or the like. The specimen containers 106 may be any suitably transparent or translucent container, such as a blood collection tube, test tube, sample cup, cuvette, or other clear or opaque glass or plastic container capable of containing and allowing imaging of the specimen 104 contained therein. The specimen containers 106 may be varied in size.

In more detail, specimen testing apparatus 150 may include a base 162 (e.g., a frame, floor, or other structure) upon which a track 118 may be mounted. The track 118 may be a railed track (e.g., a mono rail or a multiple rail), a collection of conveyor belts, conveyor chains, moveable platforms, or any other suitable type of conveyance mechanism. Track 118 may be circular or any other suitable shape and may be a closed track (e.g., endless track) in some embodiments. Track 118 may, in operation, transport individual ones of the specimen containers 106 to various locations spaced about the track 118 in carriers 120.

Carriers 120 may be passive, non-motored pucks that may be configured to carry a single specimen container 106 on the track 118 or optionally, an automated carrier including an onboard drive motor, such as a linear motor that is programmed to move about the track 118 and stop at pre-programmed locations. Other configurations of carriers 120 may be used. In some embodiments, carriers 120 may leave from the loading area 154 after being offloaded from the one or more racks 152. The loading area 154 may serve a dual function of also allowing reloading of the specimen containers 106 from the carriers 120 to the loading area 154 after pre-screening and/or analysis is completed.

A robot 166 may be provided at the loading area 154 and may be configured to grasp the specimen containers 106 from the one or more racks 152 and load the specimen containers 106 onto the carriers 120, such as onto an input lane of the track 118. Robot 166 may also be configured to reload specimen containers 106 from the carriers 120 to the one or more racks 152. The robot 166 may include one or more (e.g., at least two) robot arms or components capable of X (lateral) and Z (vertical—out of the page, as shown), Y and Z, X, Y, and Z, or r (radial) and theta (rotational) motion. Robot 166 may be a gantry robot, an articulated robot, an R-theta robot, or other suitable robot wherein the robot 166 may be equipped with robotic gripper fingers oriented, sized, and configured to pick up and place the specimen containers 106.

Upon being loaded onto track 118, the specimen containers 106 carried by carriers 120 may progress to a first pre-processing station 168. For example, the first pre-processing station 168 may be an automated centrifuge configured to carry out fractionation of the specimen 104. Carriers 120 carrying specimen containers 106 may be diverted to the first pre-processing station 168 by an inflow lane or other suitable robot. After being centrifuged, the specimen containers 106 may exit on an outflow lane, or otherwise be removed by a robot, and continue along the track 118. In the depicted embodiment, the specimen containers 106 in carriers 120 may next be transported to quality check module 100 to carry out pre-screening further described herein.

Additional station(s) may be provided at one or more locations on or along the track 118. The additional station(s) may include a de-capping station, aliquoting station, one or more additional quality check modules 100, and the like.

The specimen testing apparatus 150 may include a number of sensors 170 at one or more locations around the track 118. Sensors 170 may be used to detect locations of specimen containers 106 on the track 118 by means of reading the identification information 210$i$, or like information (not shown) provided on each carrier 120. Any suitable means for tracking the location may be used, such as proximity sensors. All of the sensors 170 may interface with computer 172, so that the location of each specimen container 106 may be known at all times.

The pre-processing stations and the analyzers 156, 158, and 160 may be equipped with robotic mechanisms and/or inflow lanes configured to remove carriers 120 from the track 118, and with robotic mechanisms and/or outflow lanes configured to reenter carriers 120 to the track 118.

Specimen testing apparatus 150 may be controlled by the computer 172, which may be a microprocessor-based central processing unit (CPU), having a suitable memory and suitable conditioning electronics and drivers for operating the various system components. Computer 172 may be housed as part of, or separate from, the base 162 of the specimen testing apparatus 150. The computer 172 may operate to control movement of the carriers 120 to and from the loading area 154, motion about the track 118, motion to and from the first pre-processing station 168 as well as operation of the first pre-processing station 168 (e.g., centrifuge), motion to and from the quality check module 100 as well as operation of the quality check module 100, and motion to and from each analyzer 156, 158, 160 as well as operation of each analyzer 156, 158, 160 for carrying out the various types of testing (e.g., assay or clinical chemistry). Computer 124 of FIGS. 1A and 1B may be part of or separate from computer 172 of FIG. 1C.

Figure 3A:
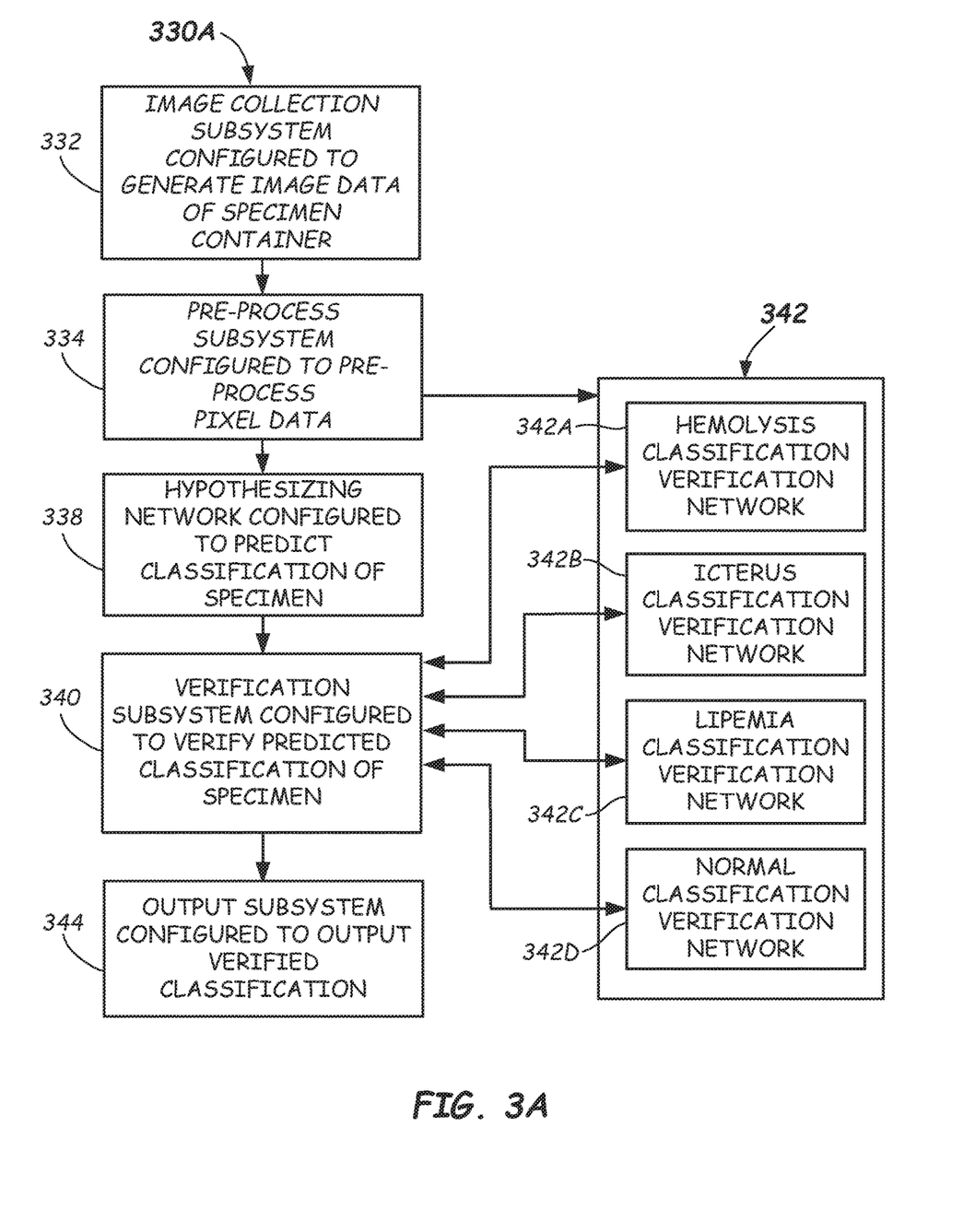
FIG. 3A illustrates a block diagram of functional components of a quality check module including a hypothesizing network and a verification network operative to output an interferent classification of a serum or plasma portion of a specimen in a specimen container and a degree of certainty of the classification according to one or more embodiments.

Additional reference is made to FIG. 3A, which illustrates an apparatus 330A that includes functional components configured to carry out the HIL or HILN characterization and verification methods described herein. The apparatus 330A may be embodied within the quality check module 100 (FIGS. 1A-1C) controlled by the computer 124 and/or 172. For example, each functional component may be implemented in software, hardware or a combination of software and hardware. As discussed above, the specimen container 106 may be provided at the imaging location 116 (FIG. 1A) of the quality check module 100. Multi-view images of the specimen container 106 may be captured in image collection subsystem 332 by one or more of the plurality of image capture devices 110A-110C. The pixel data for each of the multi-view, multi-spectral, multi-exposure images may be pre-processed in pre-process subsystem 334 as discussed above to provide a plurality of optimally-exposed and normalized image data sets (hereinafter "image data sets"). One or more image data sets of an image of a specimen container may be used by a hypothesizing network 338 to predict a specimen classification. In some embodiments, the hypothesizing network 338 may be a segmentation network and/or a classification network.

Given one or more image data sets, the hypothesizing network 338 is operative to assign an HILN classification to each pixel of an image based on its local appearance as indicated by its pixel data value. In some embodiments, the hypothesizing network 338 may predict a classification of the serum or plasma portion of a specimen based on color or at least partially based on color represented by the pixel data of the serum or plasma portion. In some embodiments, the classifications may include an un-centrifuged class. The classifications may include fewer or more classes and subclasses. In some embodiments, the hypothesizing network may determine whether a sample has been centrifuged. If the sample has not been centrifuged, a notification may be generated to inform a laboratory technician that an HIL classification cannot be performed. In addition, the apparatus 330A may skip HIL classification of the uncentrifuged sample.

The apparatus 330A verifies the predicted classification of the specimen in verification subsystem 340. The verification subsystem 340 may include or be coupled to one or more verification networks 342. The embodiment illustrated in FIG. 3A includes four verification networks 342. A hemolysis verification network 342A (sometimes referred to as a "first verification network") may be trained on hemolysis classifications so as to verify hemolysis predictions. An icterus verification network 342B (sometimes referred to as a "second verification network") may be trained on icterus classifications to verify icterus predictions. A lipemia verification network 342C (sometimes referred to as a "third verification network") may be trained on lipemia classifications to verify lipemia predictions. A fourth verification network 342D may be trained to verify normal predictions. Some embodiments do not include the fourth verification network 342D and do not verify normal classifications. Other numbers and types of verification networks 342 may be used.

During operation of the apparatus 330A, the hypothesizing network 338 may predict a hemolysis classification of a specimen, for example. Verification subsystem 340 may then transmit one or more image data sets to the hemolysis verification network 342A, which may be trained solely to verify hemolysis. The hemolysis verification network 342A may generate signals indicating a correct or incorrect hemolysis prediction.

The apparatus 330A may output a verified classification (using output subsystem 344), which may be generated based on the output of the verification networks 342. The verified output of output subsystem 344 may be based on positive results generated by the verification networks 342. For example, the verification networks 342 may verify or reject the prediction of the HIL classification generated by the hypothesizing network 338. Should the verification networks 342 verify the hypothesizing network 338, output subsystem 344 may output the HIL determination of the hypothesizing network 338 with a certainty greater than a predetermined level of certainty. For example, the verified output, and thus the output of the apparatus 330A, may determine with a certainty of 98% that the HIL classification is correct. Other certainty levels may be used. In some embodiments, the verified output may be a signal indicating that the apparatus 330A was not able to make a determination of the HIL classification within a predetermined level of certainty. In some situations, the verified output may indicate that the specimen should be analyzed manually.

Figure 3B:
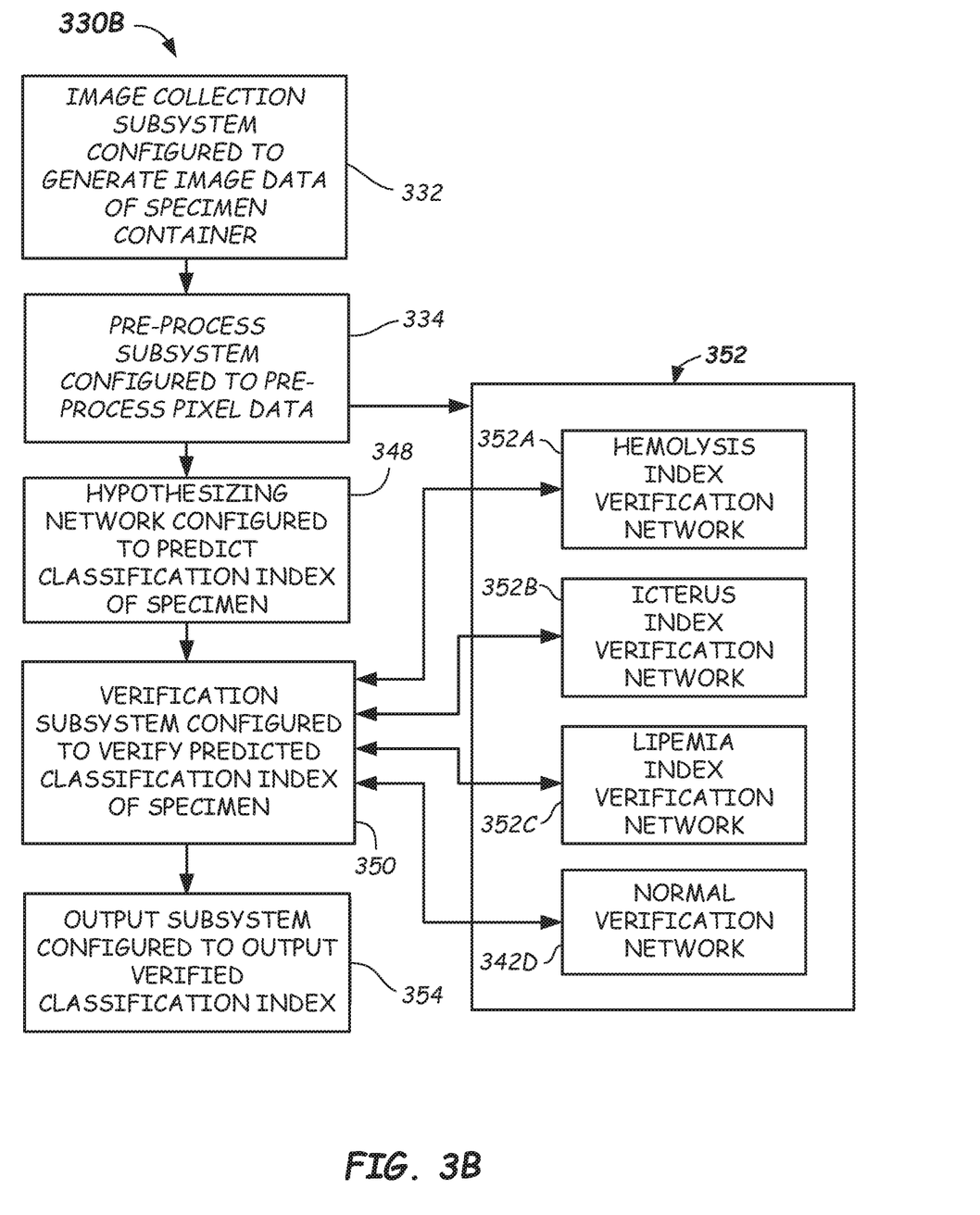
FIG. 3B illustrates a block diagram of functional components of a quality check module including a hypothesizing network and an index verification network operative to output an interferent classification index of a serum or plasma portion of a specimen in a specimen container and a degree of certainty of the classification index according to one or more embodiments.

Additional reference is made to FIG. 3B, which illustrates an embodiment of an apparatus 330B that predicts classification indexes and verifies the predicted classification indexes of specimens. For example, the apparatus 330B predicts and verifies classification indexes within HIL classes. The apparatus 330B is similar to apparatus 330A of FIG. 3A but includes a hypothesizing network 348 that replaces the hypothesizing network 338 of FIG. 3A and predicts a classification index of a specimen. In some embodiments, the classification indexes may include 21 serum classes, including an un-centrifuged class, a normal class, and 19 HIL classes/subclasses. The classification indexes may include fewer or more or different classes and subclasses.

The apparatus 330B includes verification subsystem 350 that replaces verification subsystem 340 of FIG. 3A and verifies the predicted classification index, such as by using index verification networks 352. The index verification networks 352 may be trained to verify specific HIL classification indexes. For example, one or more of the index verification networks 352 may be a binary classifier that determines whether the hypothesis generated by the hypothesizing network 338 or the hypothesizing network 348 is correct or not.

A hemolysis index verification network 352A (sometimes referred to as a "first index verification network") may be trained to verify individual hemolysis classification indexes. An icterus index verification network 352B (sometimes referred to as a "second index verification network") may be trained to verify individual icterus classification indexes. A lipemia index verification network 352C (sometimes referred to as a "third index verification network") may be trained to verify individual lipemia classification indexes. The index verification networks 352 may include the fourth verification network 340D, which may be trained to verify normal classifications as described above. Some embodiments do not include the fourth verification network 342D and do not verify normal classifications. Other numbers and types of index verification networks may be used.

The hemolysis index verification network 352A may verify a plurality of individual predicted hemolysis classification indexes. In some embodiments, the hemolysis index verification network 352A may include an individual neural network, such as a CNN, to verify each predicted hemolysis classification index. The icterus index verification network 352B may verify a plurality of individual predicted icterus classification indexes. In some embodiments, the icterus index verification network 352B may include an individual neural network, such as a CNN, to verify each predicted icterus classification index. In the same manner, the lipemia index verification network 352C may verify a plurality of predicted lipemia classification indexes. In some embodiments, the lipemia index verification network may include an individual neural network, such as a CNN, to verify each lipemia classification index.

As an example of the operation of the apparatus 330B, the hypothesizing network 348 may predict a hemolysis classification index of H3 for a specimen, for example. Verification subsystem 350 may then transmit one or more image data sets to the hemolysis index verification network 352A, which may be trained solely to verify a hemolysis classification index of H3. The hemolysis index verification network 352A may generate a signal indicating a correct or incorrect prediction. In some embodiments, the index verification networks 352 may generate weighted responses, such as percentages, that are related to the certainty of the predictions. For example, the weighted response may determine if the prediction exceeds a predetermined confidence level.

The apparatus 330B may output a verified classification index using output subsystem 354, which may be generated based on the output of the index verification networks 352. The verified output of output subsystem 354 may be based on positive results generated by the index verification networks 352. For example, the index verification networks 352 may verify or reject the prediction of the HIL classification index predicted by the hypothesizing network 348. Should the index verification networks 352 verify the hypothesizing network 348, output subsystem 354 may output the HIL classification index predicted by the hypothesizing network 348 with a predefined level of certainty. For example, the verified output, and thus the output of the apparatus 330B may have a certainty of 98% that the predicted HIL classification index is correct. Other certainty levels may be used. In some embodiments, the verified output may be a signal indicating that the apparatus 330B was not able to make a determination of the HIL classification index within a predetermined certainty. In some situations, the verified output may indicate that the specimen should be analyzed manually.

In some situations, a first classification index may be close to a second classification index. Confusion may occur between the first and second classification indexes, such as a first classification index being identified as the second classification index or vice versa. In order to overcome these issues, the index verification networks 352 may include verification networks that distinguish between classification indexes. For example, the index verification networks may include a network, such as an expert network, that is trained to distinguish the above-described first classification index from the second classification index. Accordingly, confusion between close classification indexes is alleviated.

Figure 4:
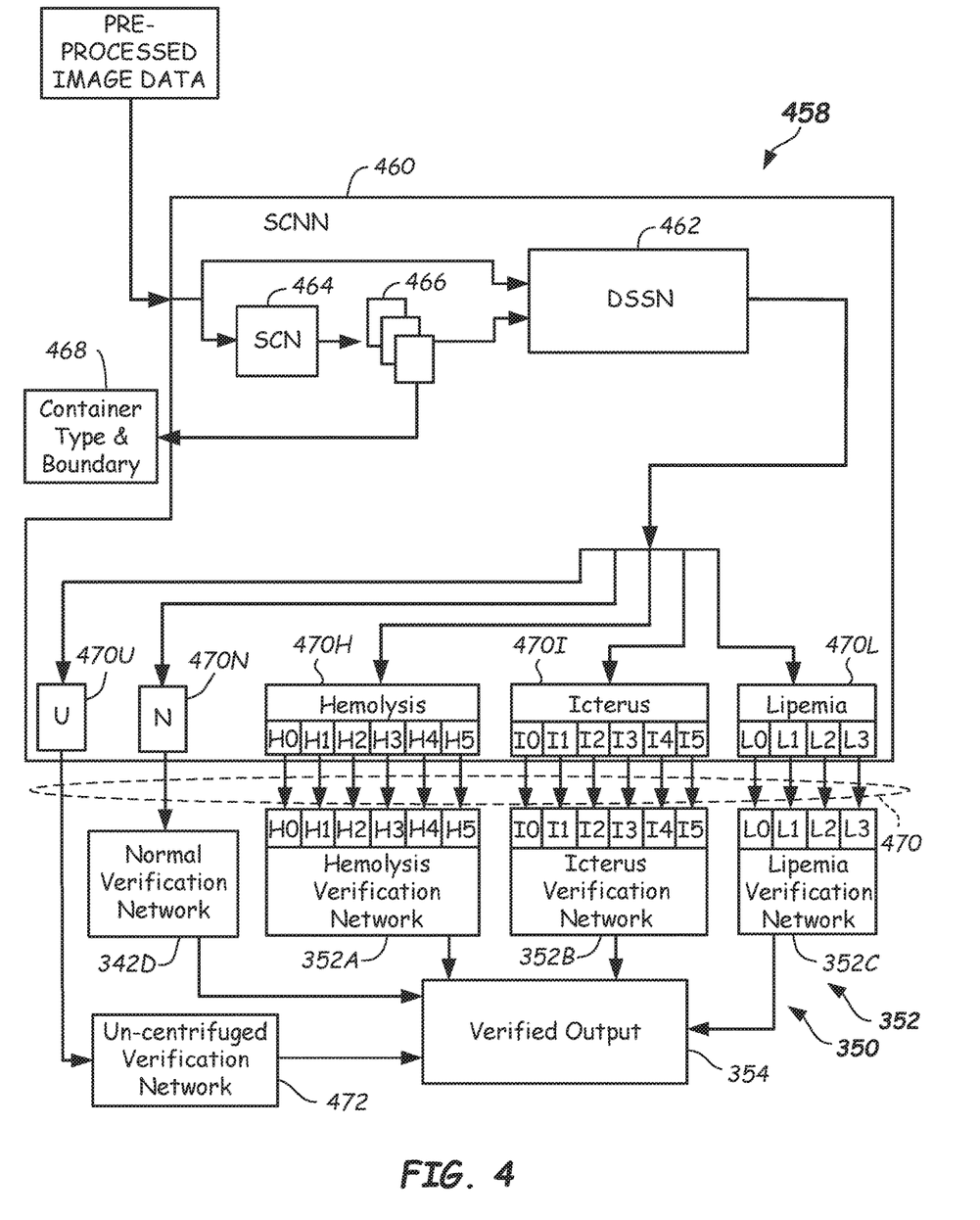
FIG. 4 illustrates a block diagram of functional components of a quality check module including a segmentation convolutional neural network (SCNN) operative to output an interferent classification index of a serum or plasma portion of a specimen in a specimen container according to one or more embodiments.

FIG. 4 illustrates an embodiment of a hypothesizing network 458 that includes functional components configured to carry out the HIL(N) hypothesizing methods described herein. The hypothesizing network 458 depicted in FIG. 4 is coupled to a plurality of index verification networks 352 (e.g., 352A-C). The hypothesizing network 458 may be embodied within the quality check module 100 (FIGS. 1A-1C) controlled by the computer 124 and/or 172 (e.g., in a memory in communication with or within computer 124 and/or 172). The hypothesizing network 458 may be a neural network, such as a convolutional neural network, for example. As discussed above, the specimen container 106 may be provided at the imaging location 116 (FIG. 1A) of the quality check module 100. Multi-view images may be captured by the one or more image capture devices 110A-110C (FIG. 1A). The image data or pixel data for each of the multi-view, multi-spectral, multi-exposure images may be pre-processed as discussed above to provide a plurality of optimally-exposed and/or normalized image data sets. The computer 124 and/or 172 may pre-process the pixel data to generate image data sets. The image data sets may be provided as input to the hypothesizing network 458, which may be or include a segmentation convolutional neural network (SCNN) 460. The hypothesizing network 458 and/or the SCNN 460 may be programs running on the computer 124 and/or 172.

A task performed by the hypothesizing network 458 is the characterization of a specimen (e.g., specimen 104, FIGS. 1A-1B) in a specimen container, such as specimen container 106. This task may include separation of the specimen container from its background and segmentation of any labels affixed to the specimen container, followed by classification of the serum or plasma portion 204SP (FIG. 2). All these tasks may be completed with the SCNN 460, which performs pixel-level classification. Given an input image data set, which includes pixel data, the SCNN 460 may be operative to assign a classification index to each pixel of the image based on its local appearance as indicated by its pixel data value. The extracted pixel index information can be further processed by the SCNN 460 to determine a final HILN classification and/or a final HILN classification index. In some embodiments, the classification index may include 21 serum classes, including an un-centrifuged class, a normal class, and 19 HIL classes/subclasses (indexes), as described in more detail below. The classification and/or the classification index may include different, fewer or more classes and subclasses As described above, a challenge to determining an HIL classification or classification index may result from small appearance differences within each sub-class of the H, I, and L classes. Additional challenges result from different specimen container sizes and shapes and various specimen container label occlusions that can occur, as described above. For example, specimen container labels can block a view of the specimen in the specimen container or can generate a shadow region on a back side of the specimen container that can darken the appearance of the specimen.

To overcome these challenges, the SCNN 460 may include a (very) deep semantic segmentation network (DSSN) 462 that includes, in some embodiments, more than 100 operational layers. A benefit of having such a deep network is that it may increase the network reception field, which utilizes more context information rather than small local regions. Moreover, the densely connected network concatenates the features from low level to high level layers as well as from encoding to decoding regions. By doing so, the DSSN 462 can be trained more easily to recognize more detailed features from the image than other convolutional neural networks configured for the same task. The SCNN 460 may include other neural networks.

To overcome appearance differences that may be caused by variations in specimen container type (e.g., size and/or shape), the SCNN 460 may include a small container segmentation network (SCN) 464 at the front end of the DSSN 462. The SCN 464 may be configured and operative to determine a container type and a container boundary information 466. The container type and container boundary information 466 may be input via an additional input channel to the DSSN 462 and, in some embodiments, the SCNN 460 may provide, as an output, the determined container type and boundary 468. In some embodiments, the SCN 464 may have a similar network structure as the DSSN 462, but shallower (i.e., with far fewer layers).

To overcome appearance difference that may be caused by the specimen container label(s), a network loss function may be configured to support multi-label losses. That is, in some known networks, only one value may be output for each image pixel. In the SCNN 460, two values may be output for each image pixel—one for serum class and one for specimen container label class. The value for the specimen container label class may range from 0 (meaning no specimen container label) to 3 (meaning the pixel may be covered by three layers of label). By combining the two values, the SCNN 460 is better able to determine a serum or plasma portion class of a specimen fluid region obscured behind one or more specimen container labels.

As shown in FIG. 4, an output of the SCNN 460 may be a predicted classification (or classification index) 470 that, in some embodiments, may include an un-centrifuged class 470U, a normal class 470N, a hemolysis class 470H, an icterus class 470I, and a lipemia class 470L (or corresponding class index). In some embodiments, the hemolysis class 470H may include sub-classes or indexes H0, H1, H2, H3, H4, and H5. The icterus class 470I may include sub-classes or indexes I0, I1, I2, I3, I4, and I5. The lipemia class 470L may include sub-classes L0, L1, L2, and L3. Each of the hemolysis class 470H, icterus class 470I, and/or lipemia class 470L may have, in other embodiments, other numbers of sub-classes or indexes.

The results of the predicted classification (or classification index) 470 may be forwarded to the verification networks 342 (FIG. 3A) as described with reference to verification subsystem 340 (FIG. 3A) or to the index verification networks 352 as described with reference to verification subsystem 350 (FIG. 3B). The SCNN 460 may employ neural networks, such as convolutional neural networks, that run on the computer 124 and/or 172 for generating the predicted classification or classification index 470.

The index verification networks 352 depicted in FIG. 4 may include an un-centrifuged verification network 472 that verifies a prediction by the hypothesizing network 458 that the specimen 104 has not been separated into the serum or plasma portion 204SP and the settled blood portion 204SB. The index verification networks 352 may include a plurality of individual verification networks, wherein each individual verification network may be trained to verify an individual classification index. For example, a first individual verification network may be trained solely to verify H2 and a second individual verification network may be trained solely to verify H3. In some embodiments, each of the individual verification networks may be a neural network, such as a convolutional neural network. In some embodiments, the individual verification networks may be DenseNet and/or ResNet networks.

In the embodiment depicted in FIG. 4, each classification index generated by the hypothesizing network 458 may have a corresponding verification network. For example, if the hypothesizing network 458 predicts an H4 classification index for the specimen 104, the pixel data and/or the image data sets may be processed by the network within the hemolysis index verification network 352A specifically trained on H4. The index verification networks 352 may then analyze the pixel data and/or the image data sets to verify or nullify the predicted H4 classification index.

Figure 5:
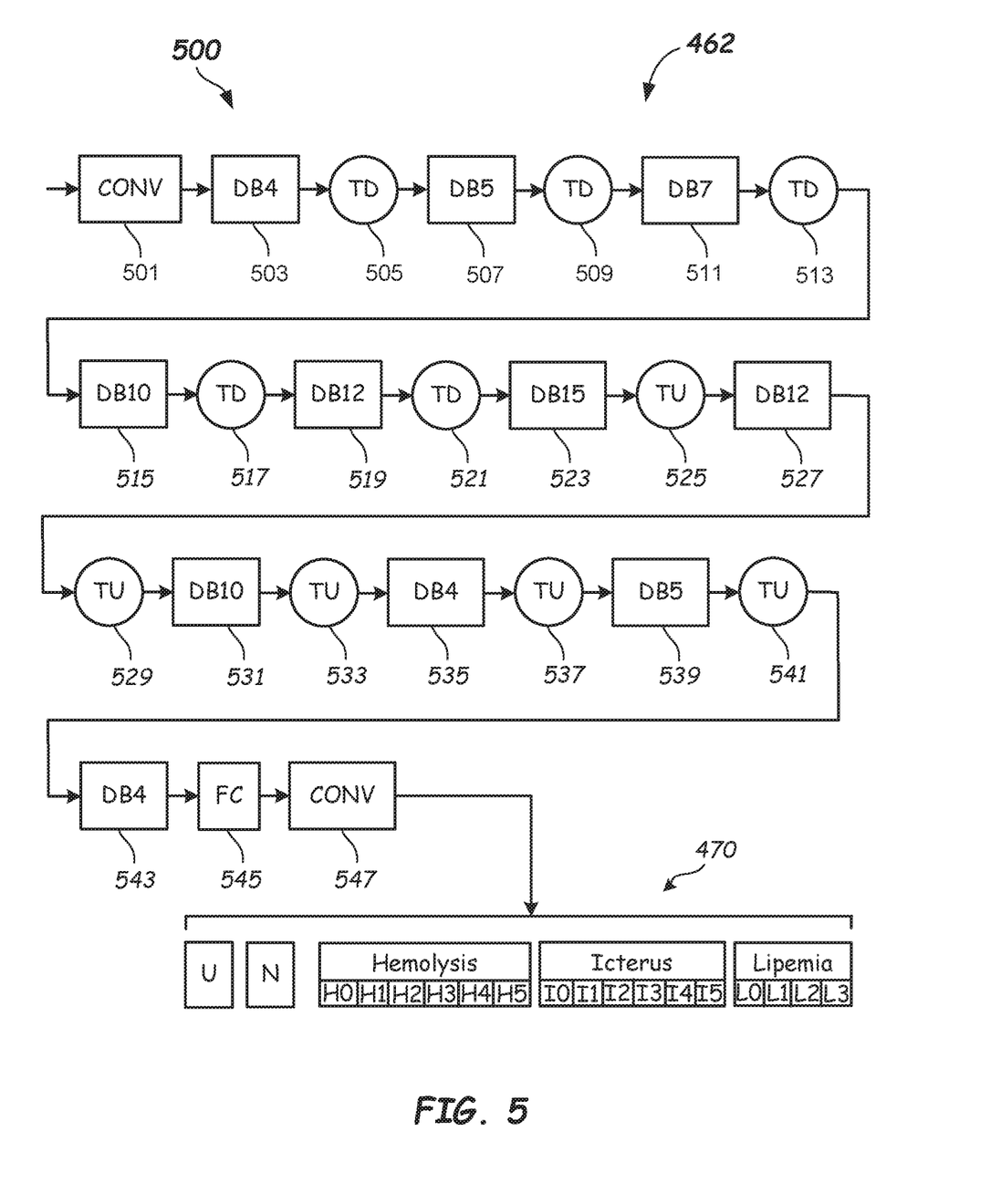
FIG. 5 illustrates a block diagram of an architecture of a deep semantic segmentation network (DSSN) of the SCNN of FIG. 4 according to one or more embodiments.

FIG. 5 illustrates an architecture 500 of and embodiment of the DSSN 462. The DSSN 462 may be coded using any suitable scientific computing framework, program, or toolbox, such as, for example, Caffe available from Berkley Vision and Learning Center (BVLC), Theano Python Library developed by Montreal Institute of Learning Algorithms, TensorFlow, Torch, and the like. Architecture 500 may include, for example, the following operational layers: two convolutional (CONV) layers 501 and 547; eleven dense block layers DB4 503, DB5 507, DB7 511, DB10 515, DB12 519, DB15 523, DB12 527, DB10 531, DB4 535, DB5 539, and DB4 543; five transition down layers TD 505, TD 509, TD 513, TD 517, and TD 521; five transition up layers TU 525, TU 529, TU 533, TU 537, and TU 541, and a fully connected layer 545 arranged as shown in FIG. 5, wherein the classification index 470 is output. Other numbers, types and/or arrangements of layers may be used.

In some embodiments, each of dense block layers DB4 503, 535, and 543 may include four dense layers. Each of dense block layers DB5 507 and 539 may include five dense layers. Dense block layer DB7 511 may include seven dense layers. Each of dense block layers DB10 515 and 531 may include ten dense layers. Each of dense block layers DB12 519 and 527 may include twelve dense layers and dense block layer DB15 523 may include fifteen dense layers. In some embodiments, each dense layer may include a batch normalization operation, a ReLU layer, and a 3×3 convolutional layer with dropout p=0.2, wherein a first dense layer receives an input and outputs a number of pixel label maps, which are concatenated to the input. A second dense layer then receives the concatenated output as its input and outputs a number of pixel label maps, which are again concatenated to the previous pixel label maps. This may be repeated for each dense layer in the dense block layer. Other numbers and/or types of dense layers may be used.

In some embodiments, each transition down layer TD 505, TD 509, TD 513, TD 517, and TD 521 may include a batch normalization operation, followed by a ReLu layer, followed by a 3×3 convolutional layer with dropout p=0.2, followed by a 2×2 max pooling layer. Note that the dropout probability may range from 0 to 1 depending on the experimental test runs that result in the best outcome. In some embodiments, the number of pixel label maps at the output of layer TD 505 may be 112, at the output of TD 509 may be 192, at the output of TD 513 may be 304, at the output of TD 517 may be 464, and at the output of TD 521 may be 656. Other types of transition down layers may be used and/or other numbers of pixel label maps may be output in other embodiments. In some embodiments, each transition up layer TU 525, TU 529, TU 533, TU 537, and TU 541 may include a 3×3 transposed convolutional layer with stride 2. Other transition up layer parameters may be used.

In some embodiments, the number of pixel label maps at the output of DB15 523 may be 896, at the output of DB12 527 may be 1088, at the output of DB10 531 may be 816, at the output of DB4 535 may be 578, at the output of DB5 539 may be 384, and at the output of DB4 543 may be 256. Other numbers of pixel label maps may be output in other embodiments.

Figure 6:
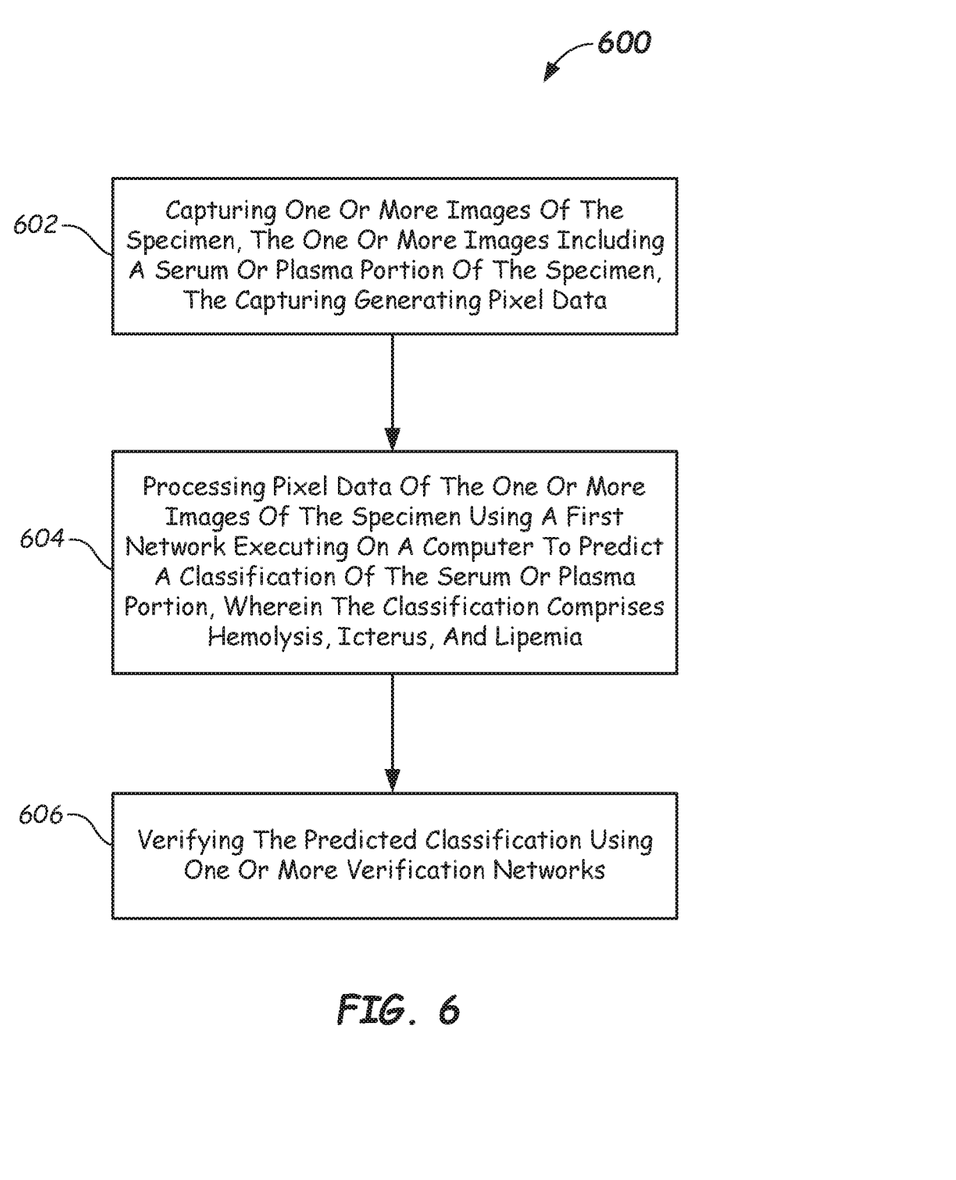
FIG. 6 is flowchart of a method of characterizing and verifying a specimen within a specimen container according to one or more embodiments.

Reference is now made to FIG. 6, which illustrates a flow chart depicting a method 600 of characterizing a specimen (e.g., specimen 104). The method 600 includes, at 602, capturing one or more images of the specimen, the one or more images including a serum or plasma portion (e.g., serum or plasma portion 204SP) of the specimen, the capturing generating pixel data. The method 600 includes, at 604, processing pixel data of the one or more images of the specimen using a first network (e.g., SCNN 460) executing on a computer (e.g., computer 124 and/or 172) to predict a classification of the serum or plasma portion, wherein the classification comprises hemolysis, icterus, and lipemia. The method includes, at 606, verifying the predicted classification using one or more verification networks (e.g., verification networks 342). A similar method may be performed for verifying a predicted classification index.

As used herein, a convolution layer is a processing step that may apply a filter (also referred to as a kernel) to input image data (e.g., pixel intensity values) to output an activation map that may indicate detection of some specific type of color or feature (e.g., from a simple curve after application of a first convolution layer to somewhat more complex features after application of several convolution layers) at some spatial position in the input image data.

A max pooling layer is a processing step that may apply a filter to generate output activation maps having maximum pixel values appearing in the one or more activation maps received from a convolutional layer.

A ReLU (rectified linear unit) layer is a processing step that may apply a nonlinear function to all values in a received activation map resulting in, e.g., all negative activation values being assigned a value of zero.

A fully connected layer is a processing step that aggregates previous activation maps (each of which may indicate detection of lower level features) to indicate detection of higher-level features.

A softmax layer is typically a final processing step that outputs a probability distribution highlighting or identifying the most likely feature of one or more images from a class of image features. Another challenge to determining an HIL classification index is having the SCNN 460 output a homogenous structure. That is, the challenge is to avoid having the serum or plasma portion classified as a combination of different HIL classes. This may occur because the loss function in a semantic segmentation network may evaluate each pixel individually. Although the DSSN 462 uses the context information in response to a large reception field, there may otherwise be no restriction to output homogenous classes for each pixel of the same image of the specimen container.

Although the disclosure is described herein with reference to specific embodiments, the disclosure is not intended to be limited to the details described. Rather, various modifications may be made in the details within the scope and range of equivalents of this disclosure without departing from the disclosure.

What is claimed is:

1. A method of characterizing a specimen, comprising:
receiving an image of the specimen, the image including pixel data representative of the specimen;
providing a multi-stage hierarchical network system having:
a first, hypothesizing network trained to classify multiple categories including hemolysis, icterus, and lipemia (HIL) and multiple classes of categories including at least multiple classes of hemolysis; and
a plurality of HIL verification networks, each verification network trained solely on a respective one of the multiple categories including a respective verification network trained solely on each one of the multiple hemolysis classes, at least one verification network comprising a convolutional neural network;
processing pixel data of the image of the specimen using the first hypothesizing network executing on a computer to predict a classification of the specimen, wherein the classification comprises at least a category of hemolysis, icterus, or lipemia;
verifying the predicted classification of the first hypothesizing network using one of the verification networks trained solely on the predicted classification by processing pixel data of the image of the specimen using the one of the verification networks; and
reporting a failure case if the one of the verification networks used to verify the predicted classification of the first hypothesizing network fails to verify the predicted classification.

2. The method of claim 1, further comprising:
verifying the predicted classification by a verification network trained solely on hemolysis in response to the first hypothesizing network predicting a hemolysis classification of the specimen;
verifying the predicted classification by a verification network trained solely on icterus in response to the first hypothesizing network predicting an icterus classification of the specimen; and
verifying the predicted classification by a verification network trained solely on lipemia in response to the first hypothesizing network predicting a lipemia classification of the specimen.

3. The method of claim 1, wherein:
processing pixel data further comprises predicting a classification index for one of hemolysis, icterus, and lipemia; and
verifying the predicted classification further comprises verifying the predicted classification index using one of the plurality of HIL verification networks trained solely on the predicted classification index.

4. The method of claim 1, wherein:
processing pixel data further comprises predicting a hemolysis classification index; and
verifying the predicted classification further comprises verifying the predicted hemolysis classification index using an index verification network of the plurality of HIL verification networks trained solely on the predicted hemolysis classification index.

5. The method of claim 1, wherein:
processing pixel data further comprises predicting an icterus classification index; and
verifying the predicted classification further comprises verifying the predicted icterus classification index using an index verification network of the plurality of HIL verification networks trained solely on the predicted icterus classification index.

6. The method of claim 1, wherein:
processing pixel data further comprises predicting a lipemia classification index; and
verifying the predicted classification further comprises verifying the predicted lipemia classification index using an index verification network of the plurality of HIL verification networks trained solely on the predicted lipemia classification index.

7. The method of claim 1, wherein the classification further comprises a normal classification.

8. The method of claim 7, further comprising verifying the normal classification using a verification network trained on a normal classification.

9. The method of claim 1, wherein processing pixel data of the image of the specimen using the first hypothesizing network comprises processing pixel data of one or more images of the specimen using a segmentation network.

10. The method of claim 1, wherein processing pixel data of the image of the specimen using the first hypothesizing network comprises processing pixel data of one or more images of the specimen using a classification network.

11. The method of claim 1, wherein processing pixel data comprises:
   identifying a serum or plasma portion in the specimen using a deep semantic segmentation network; and
   predicting a classification index of the serum or plasma portion of the specimen using the deep semantic segmentation network based at least partially on color represented by the pixel data of the serum or plasma portion.

12. The method of claim 1, wherein the first hypothesizing network comprises an architecture including at least eleven dense block layers.

13. The method of claim 1, further comprising generating a confidence level in response to verifying the predicted classification using one or more of the plurality of HIL verification networks.

14. The method of claim 1, further comprising generating a confidence level in response to verifying the predicted classification using one or more of the plurality of HIL verification networks and generating a signal in response to the confidence level being below a predetermined level.

15. The method of claim 1, wherein the plurality of verification networks comprises two or more convolutional neural networks.

16. A non-transient computer-readable data storage medium comprising executable program code that includes a system, comprising:
   a multi-stage hierarchical network system having:
      a first, hypothesizing network trained to classify multiple categories including hemolysis, icterus, and lipemia (HIL) and multiple classes of categories including at least multiple classes of hemolysis; and
      a plurality of HIL verification networks, each verification network trained solely on a respective one of the multiple categories including a respective verification network trained solely on each one of the multiple hemolysis classes, the at least one verification network comprising a convolutional neural network;
   wherein the multi-stage hierarchical network system is configured to:
      receive an image of the specimen, the image including pixel data representative of the specimen;
      process pixel data of the image of the specimen using the first hypothesizing network executing on a computer to predict a classification of the specimen, wherein the classification comprises at least one of hemolysis, icterus, or lipemia;
      verify the predicted classification of the first hypothesizing network using one of the verification networks trained solely on the predicted classification by processing pixel data of the image of the specimen using the one of the verification networks; and
      report a failure case if the verification network used to verify the predicted classification of the first hypothesizing network fails to verify the predicted classification.

17. The non-transient computer-readable data storage medium of claim 16, wherein the multi-stage hierarchical network system is further configured and operative to process pixel data to predict a normal classification of the serum or plasma portion.

18. The non-transient computer-readable data storage medium of claim 16, wherein the multi-stage hierarchical network system is configured and operative to:
   process pixel data to predict a classification index; and
   verify the predicted classification index using one of the plurality of HIL verification networks trained solely on the predicted classification index.

19. The non-transient computer-readable data storage medium of claim 16, wherein the multi-stage hierarchical network system is configured and operative to:
   verify the predicted classification by a verification network trained solely on hemolysis in response to the first hypothesizing network predicting a hemolysis classification for the specimen;
   verify the predicted classification by a verification network trained solely on icterus in response to the first hypothesizing network predicting an icterus classification for the specimen; and
   verify the predicted classification by a verification network trained solely on lipemia in response to the first hypothesizing network predicting a lipemia classification for the specimen.

20. The non-transient computer-readable data storage medium of claim 16, wherein the plurality of verification networks comprises two or more convolutional neural networks.

21. A specimen testing apparatus, comprising:
   a track;
   a carrier moveable on the track and configured to contain a specimen container containing a serum or plasma portion of a specimen therein;
   a plurality of image capture devices arranged around the track and operative to capture one or more images from one or more viewpoints of the specimen container and the serum or plasma portion of the specimen; and
   the non-transient computer-readable data storage medium of claim 16.

* * * * *